United States Patent [19]

Suh et al.

[11] Patent Number: 5,489,407
[45] Date of Patent: Feb. 6, 1996

[54] METHOD OF FORMING THERMOPLASTIC FOAMS USING CELL SIZE ENLARGING AGENTS

[75] Inventors: Kyung W. Suh, Granville; Masayuki Wakabayashi, Newark, both of Ohio; Chau V. Vo, Souffelweyersheim, France; Andrew N. Paquet, Granville, Ohio

[73] Assignee: The Dow Chemical Company, Midland, Mich.

[21] Appl. No.: 278,283

[22] Filed: Jul. 21, 1994

Related U.S. Application Data

[63] Continuation of Ser. No. 9,155, Jan. 26, 1993, abandoned.

[51] Int. Cl.$^6$ ................................................ B29C 44/20
[52] U.S. Cl. .......................... 264/50; 264/51; 264/53; 264/DIG. 13
[58] Field of Search ...................... 264/50, 51, 53, 264/DIG. 13

[56] References Cited

U.S. PATENT DOCUMENTS

| | | | |
|---|---|---|---|
| 3,346,520 | 10/1967 | Lee | 260/17 |
| 3,916,023 | 10/1975 | Porter et al. | 264/DIG. 13 |
| 3,991,020 | 11/1976 | Alvares et al. | 260/2.5 |
| 4,229,396 | 10/1980 | Suh et al. | 264/53 |
| 4,312,957 | 1/1982 | Spicuzza, Jr. | 521/60 |
| 4,386,165 | 5/1983 | Suh | 521/79 |
| 4,412,961 | 11/1983 | DiBiasi et al. | 264/DIG. 13 |
| 4,927,859 | 5/1990 | Weber et al. | 521/59 |
| 4,940,735 | 7/1990 | Kress | 521/86 |
| 4,940,735 | 7/1990 | Kress | 521/86 |
| 5,011,866 | 4/1991 | Suh | 521/97 |
| 5,071,703 | 12/1991 | Weber et al. | 428/332 |
| 5,081,162 | 1/1992 | Farkas et al. | 521/133 |
| 5,189,071 | 2/1993 | Rhoads et al. | 521/79 |
| 5,189,072 | 2/1993 | Rhoads et al. | 521/88 |

FOREIGN PATENT DOCUMENTS

| | | |
|---|---|---|
| 43-6522 | 3/1968 | Japan . |
| 4541101 | 12/1970 | Japan . |
| 47-25147 | 7/1972 | Japan . |
| 60-252639 | 12/1985 | Japan . |
| 1316465 | 5/1973 | United Kingdom ........... C08G 53/08 |

*Primary Examiner*—Allan R. Kuhns
*Attorney, Agent, or Firm*—J. Robert Dean, Jr.

[57] ABSTRACT

A process for making a closed-cell, alkenyl aromatic polymer foam structure having enlarged cell size. An alkenyl aromatic polymer material is heated to form a melt polymer material. An amount of a non-waxy cell size enlarging agent is incorporated into the melt polymer material. The enlarging agent is present in an amount sufficient to enlarge the stabilized cell size of the formed foam structure by 20 percent or more over a corresponding foam structure made without the enlarging agent. Further, the enlarging agent is incorporated in a quantity such that the formed foam structure has physical properties substantially the same degree as the corresponding foam structure. A blowing agent is incorporated into the melt polymer material at an elevated pressure to form a foamable gel. The foamable gel is expanded in a zone of lower pressure to form the foam structure. Further, disclosed is a foam structure corresponding to the above.

13 Claims, No Drawings

METHOD OF FORMING THERMOPLASTIC FOAMS USING CELL SIZE ENLARGING AGENTS

CROSS-REFERENCE TO RELATED APPLICATION

This is a continuation of application Ser. No. 08/009,155, filed Jan. 26, 1993, now abandoned.

BACKGROUND OF THE INVENTION

This invention relates to a process for making a closed-cell, alkenyl aromatic polymer foam structure having an enlarged average cell size.

Due to present environmental concerns over the use of potentially ozone-depleting flammable blowing agents it is desirable to make an alkenyl aromatic polymer foam structure with pristine blowing agents. Such pristine blowing agents typically include inorganic blowing agents such as carbon dioxide, nitrogen, water, argon, and the like.

A problem with using pristine blowing agents is maintaining desirable morphology in the resulting foam structure. One characteristic of the morphology is cell size. A desirable cell size can be difficult to maintain when using pristine (inorganic) blowing agents, particularly carbon dioxide, because of their relatively high nucleation and expansion rates.

Prior art attempts to make a foam structure having an enlarged cell size include the integration of a wax in a foam-forming gel prior to extrusion of the gel through a die to form the foam structure. Such use of a wax is seen in U.S. Pat. No. 4,229,396, which is incorporated herein by reference. Use of a wax may, however, create processing problems and physical property abherations in the foam structure. The wax may cause thermal stability variations or diminution in physical properties in the foam structure. The wax may also cause inconsistency in extrusion temperatures.

It would be desirable to make a foam structure with a blowing agent comprised partially or entirely of a pristine blowing agent with a desirable (enlarged) average cell size. It would further be desirable to make such foam structures with non-pristine blowing agents. It would further be desirable to make such foam structures while retaining desirable physical properties and thermal stability. It would be further desirable to make such foam structures without using a wax.

SUMMARY OF THE INVENTION

According to the present invention, there is a process for making a closed-cell, alkenyl aromatic polymer foam structure having an enlarged average cell size. The process comprises a) heating an alkenyl aromatic polymer material to form a melt polymer material; b) incorporating a substantially non-waxy cell size enlarging agent into the melt polymer; c) incorporating a blowing agent into the melt polymer material at an elevated pressure to form a foamable gel; and d) expanding the foamable gel at a reduced pressure to form a foam structure. The alkenyl aromatic polymer comprises greater than 50 percent by weight alkenyl aromatic monomeric units. The enlarging agent is incorporated in an amount sufficient to enlarge the average cell size of the foam structure by about 20 percent or more over a corresponding foam structure made without the enlarging agent. Further, the enlarging agent is incorporated in a quantity such that the foam structure has physical properties substantially the same in degree as the corresponding foam structure.

Further according to the present invention, there is a foamable alkenyl aromatic polymer gel capable of forming a closed-cell, alkenyl aromatic polymer foam structure having an enlarged average cell size. The gel comprises a) a melt of an alkenyl aromatic polymer; b) an amount of a non-waxy cell size enlarging agent; and c) an amount of a blowing agent at an elevated pressure. The alkenyl aromatic polymer material comprises greater than 50 percent by weight alkenyl aromatic monomeric units. The enlarging agent is present in an amount sufficient to enlarge the average cell size of the foam structure by about 20 percent or more over a corresponding foam structure made without the enlarging agent. Further, the enlarging agent is incorporated in a quantity such that the foam structure has physical properties substantially the same in degree as the corresponding foam structure.

DETAILED DESCRIPTION

The present foam structure comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alpha-methylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{1-4}$ alkyl acids and esters, ionomeric derivatives, and $C_{2-6}$ dienes may be copolymerized with alkenyl aromatic compounds. Examples of copolymerizable compounds include acrylic acid, methacrylic acid, maleic acid, itaconic acid, acrylonitrile, maleic anhydride, methyl acrylate, ethyl acrylate, methyl methacrylate, vinyl acetate and butadiene. Preferred structures comprise substantially (i.e. greater than 95%) and most preferably entirely of polystyrene because polystyrene foam is economical, and is commonly employed as an insulating plastic foam.

The present alkenyl aromatic polymer foam is generally prepared by heating an alkenyl aromatic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded through a die of desired shape to a zone of lower or reduced pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Blowing agents useful in making the present foam structure include inorganic agents, organic blowing agents and chemical blowing agents. Suitable inorganic blowing agents include carbon dioxide, nitrogen, argon, water, air, and helium. A useful blowing agent is a blend of carbon dioxide and water. Organic blowing agents include aliphatic hydrocarbons having 1–9 carbon atoms and fully and partially halogenated aliphatic hydrocarbons having 1–4 carbon atoms. Aliphatic hydrocarbons include methane, ethane, ethanol, propane, n-butane, isobutane, n-pentane, isopentane, neopentane, and the like. Fully and partially halogenated aliphatic hydrocarbons include fluorocarbons, chlorocarbons, and chlorofluorocarbons. Examples of fluorocarbons include methyl fluoride, perfluoromethane, ethyl fluoride, difluoromethane, 1,1-difluoroethane, 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, chlorodifluoromethane (HCFC-22), 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. A useful blowing agent is a blend of HCFC-142b and carbon dioxide and optionally HCFC-22. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

For environmental reason, it is desirable to employ inorganic blowing agents whenever possible. Two particularly desirable inorganic blowing agents are carbon dioxide and water.

The amount of blowing agent incorporated into the polymer melt material to make a foam-forming polymer gel is from about 0.2 to about 5.0, preferably from about 0.5 to about 3.0, and most preferably from about 1.0 to 2.50 moles per kilogram of polymer.

The foam component of the present foam structure has the density of from about 10 to about 150 and most preferably from about 10 to about 70 kilograms per cubic meter ($kg/m^3$). The foam structure has an average cell size of from about 0.1 to about 5.0 millimeters and preferably from about 0.15 to about 2.4 millimeters according to ASTM D3576.

The cell size enlarging agent has the capability to and is present in an amount sufficient to enlarge or increase the average cell size of the present foam structure over that of a corresponding foam structure without the agent. The average cell size is enlarged or increased by about 20 percent or more and preferably by about 30 percent or more over that of the corresponding foam without the agent. The average cell size refers to the cell size of the present foam structure 30 minutes after extrusion or expansion thereof. The cell size enlarging agent is preferably present at from about 0.05 to about 5.0 parts per hundred and more preferably from about 0.1 to about 3 parts per hundred based upon the weight of the alkenyl aromatic polymer material.

The cell size enlarging agent is an organic material which melts below the foaming temperature of the alkenyl aromatic polymer foam structure. Foaming temperatures for alkenyl aromatic polymer foam structures typically range from about 110° C. to 135° C. The cell size enlarging agent either partly or substantially dissolves in the foamable gel of the polymer and blowing agent at the foaming temperature.

The cell size enlarging agent is of a nature and is present in an amount such that it does not deleteriously impact the physical properties of the present foam structure. The present foam structure has physical properties substantially similar or the same in the degree as a corresponding foam structure without the cell size enlarging agent. These physical properties include compressive strength (according to ASTM D1621-79), heat distortion temperature (according to ASTM D2126-87) and environmental dimensional change (according to ASTM D2126-87). Physical properties, specifically those described above, preferably do not deviate more than 10 percent from that of the corresponding foam structure. The present foam structure is preferably more dimensionally stable than the corresponding foam structure.

The cell size enlarging agent is also substantially non-waxy. The agent is substantially non-waxy in that it usually takes a liquid form at both ambient and elevated temperatures, such as at typical foaming temperatures of 110°–135° C. The agent may, however, take a solid form at ambient temperature if it is substantially resistant to deformation at that temperature. A waxy substance is typically a solid deformable at ambient temperature without the application of heat or elevated temperature.

Suitable non-waxy cell size enlarging agents are diverse in chemical structure, and include the following: polyethylene glycol and polypropylene glycol of 1200 or more molecular weight, salts of n-tallow beta amino dipropionate, amine oxides, imidazoline, fatty acid alkanolamides of $C_{12-18}$, n-alkyl trimethyl ammonium chloride, ethoxylated linear alcohols, dioctyl ester sodium sulfosuccinic acid, polyoxyethylene sorbitan monopalmitate, diglycol laurate, fluorochemical surfactants, coco betaine, aqueous emulsions and fluids of silicone compounds such as dimethyl polysiloxane.

The cell size enlarging agent of the present invention is further distinguished from the prior art plasticizing agents because it affects the desired enlargement of average cell size without deleteriously affecting the physical properties of the foam structure. Prior art plasticizers such as those seen in Great Britain 1,316,465, U.S. Pat. No. 4,940,735, and Japan 47-25147 may enlarge or increase cell size, but also may deleteriously or negatively impact physical properties, including those described above. In particular, low molecular weight ($\leq 1000$ molecular weight) organic and inorganic compounds and polymers may enlarge cell size, but also may cause diminution in desirable physical properties. Likewise, higher molecular weight compounds and polymers may not cause diminution in physical properties, but may not enlarge cell size. In the present invention, certain organic and inorganic compounds and polymers were discovered to cause cell size enlargement without diminution in physical properties.

The foam component of the present foam structure may be closed cell or open cell. Preferably, the present foam is greater than 90 percent closed-cell according to ASTM D2856-A.

Various additives may be incorporated in the present foam structure such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The present foam structure may be used to insulate a surface by applying to the surface an insulating panel fashioned from the present structure. Such panels are useful in any conventional insulating applications such as roofing, buildings, refrigerators, etc.

The present foam structure may be formed into a plurality of discrete foamed particles for conventional loose-fill cushioning and packaging applications, or may be ground into scrap for use as blown insulation.

The following are examples of the present invention, and are not to be construed as limiting. Unless otherwise indicated, all percentages, parts, or proportions are by weight.

EXAMPLES

Foam structures were made in accordance with the present invention, and tested for cell size and retention of certain desirable physical properties. The physical properties include density, compressive strength, heat distortion temperature, and environmental dimensional change.

The foam structures were made with an apparatus comprising an extruder, a mixer, a cooler, and a die in sequence. Polymer feedstock and additives other than the blowing agent were dry blended and fed to the extruder. The blowing agent was injected into the polymer melt in the mixer to form a foamable gel. The foamable gel was cooled in the cooler, and conveyed through a die into a region of lower pressure to form the foam structure.

The polymer feedstock employed was a granular polystyrene having a weight average molecular weight of 200,000 according to size exclusion chromatography.

Density was measured according to ASTM D1622. Two specimens of each sample were averaged. Foam structure skins were removed for the tests.

Cell size was measured according to ASTM D3576.

Compressive strength was measured according to ASTM D1621-79. Two specimens of each sample were averaged. Foam structure skins were removed.

The heat distortion temperature (HDT) was measured according to ASTM D2126-87. Two specimens of each sample were averaged. Foam structure skins were removed. Each specimen was kept at 165° F./ambient humidity for three days and increase in increments of 5° F. until specimens failed.

Environmental dimensional changes (EDC) was measured according to ASTM D2126-87 (158° F./97 percent relative humidity). Two specimens of each sample were averaged. Foam structure skins were removed.

Example 1

The extruder used was a 1¼ inch (in) (3.1 centimeters (cm)) screw type extrusion line with a slit die. The foamable gel was cooled to a uniform foaming temperature of 125° C.–130° C. Blowing agent content, process conditions, and physical property values of the resulting foam structures are represented in Table 1.

The foam structure of Run B exhibited a significantly higher cell size versus the foam structure of control Run A. Further, the skin quality was better. The foam structures of Runs D and E also exhibited significantly greater cell size than the foam structure of control Run C. The foam structures of Runs D and E exhibited better skin quality as well.

Example 2

The extruder used was a 2½ in (6.3 cm) screw type extrusion line with a 1 in (2.5 cm) wide slit die. Additives included 0.05 pph magnesium oxide, 0.05 pph calcium stearate, and 0.01 pph cyano-phthalo blue based upon the weight of the polymer. For Run F, 1.0 pph hexabromocyclododecane (HBCD) was dry-blended with the polymer. The foam structure was expanded between substantially parallel forming plates downstream of the die. Blowing agent content, process conditions, and physical property values of the foam structures are represented in Tables 2A and 2B.

The foam structures of Runs G, H, and I exhibited significantly greater cell size than the foam structure of control Run F. Surprisingly, heat distortion temperatures were maintained despite adding large amounts of enlarging agent to increase the cell size.

Example 3

Foam structures were produced using the apparatus and formulation of Example 2 except for a change in blowing agent and enlarging agent content. Blowing agent content, process conditions, and physical property values for the foam structures are represented in Tables 3A and 3B.

The foam structures of Runs K and L exhibited significantly greater cell size than the foam structure of control Run J.

Example 4

Foam structures were produced using the same formulation and apparatus of Example 3 except that a 3 in (7.5 cm) wide slit die and different enlarging agents were used. Blowing agent content, process conditions, and physical property values for the foam structures are represented in Tables 4A and 4B.

The foam structures of Runs N through R exhibited significantly greater cell size than the foam structure of control Run M.

Example 5 1

The extruder used was a 2 in (5.0 cm) screw type extrusion line with a slit die. Additives included 0.15 pph barium stearate and 0.03 pph cyano-phthalo blue by weight based upon the weight of the polymer. The foam structure was expanded between substantially parallel forming plates. Blowing agent content, process conditions, and physical property values for the foam structures are represented in Tables 5A and 5B.

The foam structures of Runs O, P, T, and U exhibited significantly greater cell size than the foam structure of control Run S.

The foam structures of Run R exhibited significantly higher cell size than the foam structure of control Run Q.

Example 6

A plurality of materials were evaluated for cell-size enlarging capability. One hundred parts by weight of polystyrene was introduced into a glass ampule along with 45 parts by weight of a one-to-one by weight mixture of methyl chloride and dichloro-difluoro methane. The ampule was then cooled to dry ice temperature, sealed and permitted to warm to ambient temperature. The ampule was then heated to a temperature of 200° C. in an oil bath for a period of two to three hours until the polymer melted and a homogeneous mixture was obtained in the ampule. The ampule was then cooled to the foaming temperature of 125° C. for a period of about five to ten minutes. The glass ampule was then ruptured to permit foaming polymer to extrude therefrom. The cell-size enlarging agent was present in a proportion of one-half part by weight per one-hundred parts by weight polymer. The results are set forth in Table 6.

TABLE 2A

| RUN | BLOWING AGENT TYPE | pph | ADDITIVE TYPE | pph | $T_f$ (C°) | DIE PRESSURE psig (kPag) |
|---|---|---|---|---|---|---|
| F* | $CO_2$ | 5.0 | None | — | 124 | 1436 (9894) |
| G | $CO_2$ | 5.0 | Min. Oil | 1.00 | 124 | 1485 (10230) |
| H | $CO_2$ | 5.0 | Pyronil 45 | 2.25 | 124 | 1513 (10420) |
| I | $CO_2$ | 5.0 | Pyronil 45 | 4.50 | 124 | 1442 (9935) |

*: Control
ADDITIVE: Cell Size Enlarging Agent
$T_f$: Foaming Temperature
Pyronil 45: Atochem Inc.

TABLE 1

| RUN | POLYMER FEEDRATE lb/h (kg/h) | BLOWING AGENT TYPE | pph | ADDITIVE TYPE | pph | DIE PRESSURE psig (kPag) | DENSITY pcf (kg/m³) | CELL SIZE (mm) | SKIN QUALITY | X-SECTION (cm²) |
|---|---|---|---|---|---|---|---|---|---|---|
| A* | 15 (6.8) | $CO_2/H_2O$ | 4.0/0.3 | None | — | 1930 (13300) | 2.47 (39.5) | 0.07 | Poor | 2.00 |
| B | 15 (6.8) | $CO_2/H_2O$ | 4.0/0.3 | PPG1200 | 1.00 | 1800 (12400) | 2.12 (33.9) | 0.11 | Good | 2.20 |
| C* | 10 (4.5) | $CO_2$ | 4.0 | None | — | 1750 (12060) | 3.18 (50.9) | 0.10 | Good | 2.10 |
| D | 10 (4.5) | $CO_2$ | 4.0 | PEG200 | 2.60 | 1490 (10270) | 2.50 (40.0) | 0.24 | Excel. | 2.40 |
| E | 10 (4.5) | $CO_2$ | 4.0 | PPG1200 | 2.60 | 1520 (10470) | 2.60 (41.6) | 0.31 | Excel. | 2.80 |

*: Control
PPG1200: Polypropylene Glycol (Mw = 1200)
ADDITIVE: Cell Size Enlarging Agent
PEG200: Polyethylene Glycol (Mw = 200)
X-SECTION: Area of cross-section of foam structure
Excel.: Excellent
$H_2O$: Water
pcf: pounds per cubic foot
$CO_2$: Carbon dioxide
kg/m³: kilograms per cubic meter

TABLE 2B

| | DENSITY pcf (kg/m³) | CELL SIZE (mm) | COMPRESSIVE STRENGTH psi (kPa) | | | H.D.T. F° (C°) | E.D.C. (percent) | | | | SKIN QUALITY | SECTION (cm²) |
|---|---|---|---|---|---|---|---|---|---|---|---|---|
| RUN | | | Vert. | Extr. | Hor. | | Vert. | Extr. | Hor. | Vol. | | |
| F* | 2.35 (37.6) | 0.16 | 78 (540) | 43 (300) | 19 (130) | >185 (85) | −0.1 | −0.1 | 0 | −0.2 | Accept. | 42 |
| G | 2.18 (34.9) | 0.22 | 69 (480) | 38 (260) | 16 (110) | >185 (85) | −0.2 | −0.1 | 0.2 | −0.1 | Accept. | 45 |
| H | 2.25 (36.0) | 0.32 | 67 (460) | 35 (240) | 21 (140) | — | — | — | — | — | Good | 51 |
| I | 2.13 (34.1) | 0.43 | 55 (380) | 25 (170) | 21 (140) | >180 (82.2) | — | — | — | — | Good | 68 |

*: Control
Extr.: Extruded
H.D.T.: Heat Distortion Temperature after 210 days
Hor.: Horizontal
E.D.C.: Environmental Dimensional Change after 210 days
Vol.: Volume
Vert.: Vertical
Accept.: Acceptable

TABLE 3A

| RUN | BLOWING AGENT TYPE | pph | ADDITIVE TYPE | pph | $T_f$ (C°) | DIE PRESSURE psig (kPag) |
|---|---|---|---|---|---|---|
| J* | $CO_2/H_2O$ | 4.0/0.3 | None | — | 127 | 1536 (1060) |
| K | $CO_2/H_2O$ | 4.0/0.3 | Min. Oil | 2.25 | 127 | 1155 (7958) |
| L | $CO_2/H_2O$ | 4.0/0.3 | Min. Oil | 2.25 | 124 | 1241 (8550) |

*: Control
ADDITIVE: Cell Size Enlarging Agent

TABLE 3B

| | DENSITY pcf (kg/m³) | CELL SIZE (mm) | COMPRESSIVE STRENGTH psi (kPa) | | | H.D.T. F° (C°) [F°][(C°)] | E.D.C. percent after 10–15 days [percent after 180 days] | | | | SKIN QUALITY | X-SECTION (cm²) |
|---|---|---|---|---|---|---|---|---|---|---|---|---|
| RUN | | | Vert. | Extr. | Hor. | | Vert. | Extr. | Hor. | Vol. | | |
| J* | 2.32 (37.1) | 0.38 | 56 (390) | 45 (310) | 24 (170) | 170 (76.7) [>185][(85)] | −0.2 [0.2] | −0.2 [0] | −0.4 [0.1] | −0.8 [0.3] | Good | 60 |
| K | 2.10 (33.6) | 0.49 | 43 (300) | 42 (290) | 22 (150) | 155 (68.3) [185][(85)] | −0.3 [0.2] | −0.3 [0] | −0.9 [0.4] | −1.6 [0.6] | Good | 59 |
| L | 2.14 (34.2) | 0.50 | 54 370 | 42 290 | 23 160 | 155 (68.3) [185][(85)] | −0.4 [0.1] | −0.4 [0] | −1.4 [0.5] | −2.2 [0.6] | Good | 63 |

*: Control
H.D.T.: Heat Distortion Temperature after 10–15 days and after [180 days]
E.D.C.: Environmental Dimensional Change after 10–15 days and after [180 days]

TABLE 4A

| RUN | BLOWING AGENT TYPE | pph | ADDITIVE TYPE | pph | $T_f$ (C°) | DIE PRESSURE psig (kPag) |
|---|---|---|---|---|---|---|
| M* | $CO_2/H_2O$ | 4.0/0.3 | None | — | 127 | 1238 (8530) |
| N | $CO_2/H_2O$ | 4.0/0.3 | PPG1200 | 1.0 | 127 | 1210 (8337) |
| O | $CO_2/H_2O$ | 4.0/0.3 | PPG1200 | 3.0 | 127 | 1218 (8392) |
| P | $CO_2/H_2O$ | 4.5/0.3 | PPG1200 | 3.0 | 124 | 1240 (8544) |

TABLE 4A-continued

| RUN | BLOWING AGENT TYPE | pph | ADDITIVE TYPE | pph | $T_f$ (C°) | DIE PRESSURE psig (kPag) |
|---|---|---|---|---|---|---|
| Q | $CO_2/H_2O$ | 4.5/0.3 | PPG1200 | 3.0 | 124 | 1292 (8902) |
| R | $CO_2/H_2O$ | 4.0/0.3 | PEG200 | 1.0 | 127 | 1290 (8888) |

*: Control
ADDITIVE: Cell Size Enlarging Agent

TABLE 4B

| RUN | DENSITY pcf (kg/m³) | CELL SIZE (mm) | COMPRESSIVE STRENGTH psi (kPa) Vert. | Extr. | Hor. | H.D.T. F° (C°) [F°][(C°)] | E.D.C. percent after 21 days [percent after 45–55 days] Vert. | Extr. | Hor. | Vol. | SKIN QUALITY | X-SECTION (cm²) |
|---|---|---|---|---|---|---|---|---|---|---|---|---|
| M* | 2.58 (41.3) | 0.63 | 66 (450) | 57 (390) | 49 (340) | 195 (90.6) [190][(87.8)] | −0.3 [−0.2] | 0 [0] | −0.3 [0] | −0.9 [−0.2] | Accept. | 61 |
| N | 2.34 (37.4) | 0.74 | 58 (400) | 52 (360) | 40 (280) | 180 (82.2) [185][(85.0)] | 0 [−0.1] | −0.3 [−0.1] | −0.3 [0] | −0.7 [−0.2] | Good | 65 |
| O | 2.23 (35.7) | 1.30 | 46 (320) | 44 (300) | 33 (230) | 165 (73.9) [175][(79.4)] | 0 [0.31] | −0.2 [0.1] | −0.2 [0.1] | −0.3 [0.5] | Good | 70 |
| P | 2.12 (33.9) | 0.85 | 50 (340) | 41 (280) | 34 (230) | 165 (73.9) | −0.3 | −0.2 | −0.3 | −0.7 | Accept. | 59 |
| Q | 2.15 (34.4) | 1.02 | 52 (360) | 46 (320) | 35 (240) | 165 (73.9) | −0.6 | −0.4 | −0.3 | −1.3 | Good | 59 |
| R | (2.32) (37.1) | 0.90 | 56 (390) | 53 (370) | 41 (280) | 180 (82.2) | −0.4 | −0.4 | −0.3 | 1.2 | Good | 64 |

*: Control
H.D.T.: Heat Distortion Temperature after 21 days and after [45–55 days]
E.D.C.: Environmental Dimensional Change after 21 days and after [45–55 days]

TABLE 5A

| RUN | BLOWING AGENT TYPE | pph | ADDITIVE TYPE | pph | $T_r$ (C°) | DIE PRESSURE Bar (kPa) |
|---|---|---|---|---|---|---|
| S | F-142b/ CO₂ | 9/2.5 | None | — | 124 | 56 (5600) |
| T | F-142b/ CO₂ | 9/2.5 | PPG1200 | 1.1 | 130 | 58 (5800) |
| U | F-142b/ CO₂ | 9/2.5 | PPG1200 | 1.1 | 130 | 57 (5700) |
| O | F-142b/ CO₂ | 9/2.5 | PPG1200 | 1.1 | 131 | 58 (5800) |
| P | F-142b/ CO₂ | 9/2.5 | PPG1200 | 1.45 | 131 | 60 (6000) |
| Q | F-142b/ CO₂/ F-22 | 7/1.5/5 | None | — | 129 | 63 (6300) |
| R | F-142b/ CO₂/ F-22 | 7/1.5/5 | PPG1200 | 1.1 | 129 | 61 (6100) |

*: Control
ADDITIVE: Cell size Enlarging Agent

F-142b: HCFC-142b (1-chloro-1,1-difluoroethane)
F-22: HCFC-22 (chlorodifluoromethane)

| RUN | DENSITY (kg/cm³) | CELL SIZE (mm) | SKIN QUALITY | X-SECTION (cm²) |
|---|---|---|---|---|
| S* | 37.5 | 0.22 | Good | 40 |
| T | 31.5 | 0.30 | Excel. | 44 |
| U | 31.2 | 0.31 | Excel. | 45 |
| O | 31.0 | 0.31 | Excel. | 44 |
| P | 30.4 | 0.32 | Excel. | 43 |
| Q* | 29.8 | 0.50 | Poor | 36 |
| R | 27.8 | 0.60 | Poor | 36 |

*: Control

TABLE 6

| CELL SIZE ENLARGING AGENTS | MELTING POINT F° (C°) | FOAM DENSITY pcf (kg/m³) | CELL SIZE (mm) |
|---|---|---|---|
| Control | — | 1.30 (20.8) | 0.20 |
| A. Glycols and Esters | | | |
| Polyglycol P-1200 (The DowChemical Company) | Liquid at Room Temperature | 1.45 (23.2) | 0.49 |
| Zinc stearate RSN 131 HS (Mallincrodt, Inc.) | 120–122 (48.9–50.0) | 1.34 (21.4) | 0.75 |
| B. Surfactants and Antistatic Agents | | | |
| Deriphat 154 (Henkel Inc. USA) | 220–230 (104.4–110.0) | 1.21 (19.4) | 0.83 |
| Chemadox 330 (The Richardson Company) | Liquid at Room Temperature | 1.51 (24.2) | 1.26 |
| Antaron FC-34 (GAF Corporation) | " | 1.33 (21.3) | 0.88 |
| Ninol AA 62 (or Stepan LDA) (Stepan Chemical Co.) | " | 1.42 (22.7) | 0.58 |
| Arquad 16-50 (Armak Industrial) | " | 1.25 (20.0) | 0.88 |
| Arquad 18-50 (Armak Industrial) | " | 1.34 (21.4) | 1.06 |
| Alfonic 1218-60 (Conoco Chemical) | " | 1.61 (25.8) | 0.41 |
| Aerosol GPG (American Cyanamid) | " | 1.53 (24.5) | 0.35 |
| Tween 40 (ICI Americas Incorporated) | " | 1.43 (22.9) | 0.63 |
| Pluronic F-68 (BASF Wyandotte Corporation) | 120–140 (48.9–60.0) | 1.40 (22.4) | 0.76 |
| Sole-Onicdiglycol Laurate (Sole Chemical Corp.) | Liquid at Room Temperature | 1.35 (21.6) | 0.75 |
| FC-128 (3M Company) | 230–250 (110.0–121.1) | 1.49 (23.8) | 0.60 |
| Standapol AB-45 (Henkel Inc. USA) | Liquid at Room Temperature | 1.37 (21.9) | 0.95 |

TABLE 6-continued

| CELL SIZE ENLARGING AGENTS | MELTING POINT F° (C°) | FOAM DENSITY pcf (kg/m³) | CELL SIZE (mm) |
| --- | --- | --- | --- |
| Grafstat AE-610 (GAF Corporation) | " | 1.16 (18.6) | 0.67 |
| C. Silicone Antifoam Compounds | | | |
| GE-AF-60 (General Electric Company) | Liquid at Room Temperature | 1.39 (22.2) | 0.87 |
| GE-AF-70 (General Electric Company) | " | 1.58 (25.3) | 0.70 |
| GE-AF-72 (General Electric Company) | " | 1.48 (23.7) | 0.51 |
| DC-DB-31 (Dow Corning Corporation) | " | 1.47 (23.5) | 0.38 |
| DC-AF-FG-10 (Dow Corning Corporation) | " | 1.55 (24.8) | 0.49 |
| DC-AF-C (Dow Corning Corporation) | " | 1.45 (23.2) | 0.89 |
| DC-AF-A (Dow Corning Corporation) | " | 1.59 (25.4) | 0.98 |

Note: All cell size enlarging agents had a concentration of 0.5 percent unless otherwise stated.?

TABLE 7

GENERAL COMPOSITION OF NON-WAXY CELL SIZE ENLARGING AGENTS

| NAME | COMPOSITION |
| --- | --- |
| Polyglycol P-1200 | Polyethylene glycol 1200 molecular weight |
| Zinc stearate | |
| RSN 131 HS | |
| Deriphat 154 | Disodium salt of N-tallow beta amino dipropionate |
| Chemadox 330 | Amine oxide |
| Antaron FC-34 | Imidazoline compound |
| Ninol AA 62 | A fatty acid alkanolamide |
| Arquad 16-50 | N-alkyl trimethyl ammonium chloride (50%) |
| Arquad 18-50 | N-alkyl trimethyl ammonium chloride (50%) |
| Alfonic 1218-60 | Ethoxylated linear alcohols (70% E.O.) |
| Aerosol GPG | Dioctyl ester sodium sulfosuccinic acid |
| Tween 40 | Polyoxy-ethylene (20) sorbitan monopalmitate (polysorbate 40) |
| Pluronic F-68 | Condensate of ethylene oxide with hydrophobic base formed by condensing propylene oxide with propylene glycol |
| Sole-Onicdiglycol Laurate | Diglycol alurate |
| FC-128 | Fluorochemical surfactant (powder 100%) |
| Standapol AB-45 | Coco betaine |
| Graistat AE-610 | Modified nitrogen compound |
| GE-AF-66 | Aqueous emulsions of dimethyl polysiloxane |
| GE-AF-70 | Compounded silicone fluids |
| GE-AF-72 | Aqueous emulsions of dimethyl polysiloxane |
| DC-DB-31 | Silicone emulsion |
| DC-AF-FG-10 | Silicone emulsion |
| DC-AF-C | Silicone emulsion |
| DC-AF-A | Compounded silicone fluid |

Additional tests were conducted with the same apparatus, substantially the same procedure, and substantially the same measurement levels as the examples above. These tests employed prospective cell size enlarging agents found not to be effective in making the present foam structures. The perspective agents were ineffective because they either did not cause an enlarging of cell size or resulted in a diminution of desirable physical properties. The ineffective agents were as follows:

TABLE 8

INEFFECTIVE CELL SIZE ENLARGING AGENTS

| NAME AND COMPANY | COMPOSITION |
| --- | --- |
| Silanox 10 (Cabot Co.) | hydrophobic fumed silicon dioxide |
| Aerosil R972 (Degussa Corp.) | fumed silica |
| Microwax (Intl. Wax Refining Co.) | petroleum wax |
| Titanoxid P-25 (Degussa Corp.) | titanium dioxide |

TABLE 8-continued

INEFFECTIVE CELL SIZE ENLARGING AGENTS

| NAME AND COMPANY | COMPOSITION |
| --- | --- |
| D-17 Kieselsaure (Degussa Corp.) | silica silice |
| Hercules 918 | emulsifier |
| Syloid 63 (Grace) | silica |
| Tulco | hydrophobic fumed silica |
| Mineral oil | mineral oil |
| Quso G-30 (Philadelphia Quartz Co.) | hydrophilic precipitated silica |
| Quso Wr-50 (Philadelphia Quartz Co.) | hydrophobic silica |
| Emcol (Witco Corp.) | emulsifier |
| Miranol HM (Miranol Inc.) | monocarboxylic lauric derivative, sodium salt |
| Makon BBk (Stepan Co.) | wetting agent |
| Alkanol B (DuPont Co.) | surface active sulfonate |

While embodiments of the foamable gel and the process of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making a closed-cell, alkenyl aromatic polymer foam structure having enlarged average cell size, comprising:

a) heating an alkenyl aromatic polymer material comprising greater than 50 percent by weight alkenyl aromatic monomeric units to form a melt polymer material;

b) incorporating into the melt polymer material an amount of a substantially non-waxy cell size enlarging agent sufficient to enlarge the average cell size of the foam structure by about 20 percent or more over a corresponding foam structure made without the enlarging agent and wherein the enlarging agent is incorporated in a quantity such that the foam structure has physical properties substantially similar in degree as the corresponding foam structure, the cell size enlarging agent being selected from the group consisting of salts of n-tallow beta amino dipropionate, amine oxides, imidazoline, fatty acid alkanolamides of $C_{12-18}$, n-alkyl trimethyl ammonium ohloride, ethoxylated linear alcohols, dioctyl ester sodium sulfosuccinic acid, polyoxyethylene sorbitan monopalmitate, diglycol laurate, flourochemical surfactants, coco betaine and silicone compounds;

c) incorporating a blowing agent into the melt polymer material at an elevated pressure to form a foamable gel;

d) cooling the foamable gel to an optimum foaming temperature; and e) extruding the foamable gel through a die into a zone of reduced pressure to form the foam structure.

2. The process of claim 1, wherein the cell size enlarging agent is incorporated at from about 0.05 to about 5.0 parts per hundred based upon the weight of the alkenyl aromatic polymer material.

3. The process of claim 1, wherein the cell size enlarging agent is incorporated at from about 0.1 to about 3 parts per hundred based upon the weight of the alkenyl aromatic polymer material.

4. The process of claim 1, wherein the foamable gel is extruded through a die to form a foam structure.

5. The process of claim 1, wherein a nucleating agent is incorporated into the melt polymer material.

6. The process of claim 1, wherein the blowing agent is incorporated into the melt polymer material at a concentration of from about 0.2 to about 5.0 moles per kilogram of melt polymer material.

7. The process of claim 1, wherein the physical properties are compressive strength, heat distortion temperature, and environmental dimensional change.

8. The process of claim 7, wherein the physical properties do not vary more than 10 percent from that of the corresponding foam structure.

9. The process of claim 1, wherein the cell size enlarging agent is incorporated in an amount to enlarge the average cell size of the foam structure by about 30 percent or more over the corresponding foam structure.

10. The process of claim 1, wherein the blowing agent comprises carbon dioxide.

11. The process of claim 10, wherein the blowing agent further comprises a blowing agent selected from the group consisting of water, ethanol, and mixtures thereof.

12. The process of claim 10, wherein the blowing agent further comprises a blowing agent selected from the group consisting of 1-chloro-1,1-difluoroethane, 1,1,1,2-tetrafluoroethane, and mixtures thereof.

13. The process of claim 12, wherein the blowing agent further comprises a blowing agent selected from the group consisting of chlorodifluoromethane, 1,1-difluoroethane, difluoromethane, and mixtures thereof.

* * * * *